United States Patent [19]

Chapman et al.

[11] Patent Number: 5,321,605
[45] Date of Patent: Jun. 14, 1994

[54] PROCESS FLOW INFORMATION MANAGEMENT SYSTEM

[75] Inventors: William Chapman, Scottsdale; Gwo-Jer Chang, Mesa; DiAnn Fox, Gilbert; Shoarong Zhu, Tempe, all of Ariz.

[73] Assignee: Motorola, Inc., Schaumburg, Ill.

[21] Appl. No.: 532,310

[22] Filed: Jun. 1, 1990

[51] Int. Cl.$^5$ .......................... G06F 7/00; G06F 15/40
[52] U.S. Cl. .................................... 364/402; 364/401; 364/468
[58] Field of Search .................. 364/DIG. 1, DIG. 2, 364/401, 402, 403, 468; 395/600, 650

[56] References Cited

U.S. PATENT DOCUMENTS

| | | | |
|---|---|---|---|
| 3,703,725 | 11/1972 | Gomersall et al. | 444/1 |
| 3,845,286 | 10/1974 | Aronstein et al. | 235/151.1 |
| 4,208,712 | 6/1980 | Deutsch | 364/105 |
| 4,517,637 | 5/1985 | Cassell | 364/138 |
| 4,591,983 | 5/1986 | Bennett et al. | 364/468 |
| 4,628,434 | 12/1986 | Tashiro et al. | 364/130 |
| 4,635,182 | 1/1987 | Hintz | 364/138 |
| 4,648,023 | 4/1987 | Powell | 364/156 |
| 4,670,848 | 6/1987 | Schramm | 364/513 |
| 4,697,242 | 9/1987 | Holland et al. | 364/513 |
| 4,751,192 | 8/1990 | Chase, Jr. | 367/200 |
| 4,807,108 | 2/1989 | Ben-Arieh et al. | 364/148 |
| 4,827,423 | 5/1989 | Beaseky et al. | 364/468 |
| 4,833,597 | 5/1989 | Wakayama et al. | 384/200 |
| 4,837,680 | 6/1989 | Crockett et al. | 364/200 |
| 4,884,217 | 11/1989 | Skeirik et al. | 364/513 |
| 4,888,690 | 12/1989 | Huber | 364/200 |
| 4,888,726 | 12/1989 | Struger et al. | 364/900 |
| 4,890,227 | 12/1989 | Watanabe et al. | 384/300 |
| 4,896,269 | 1/1990 | Tong | 364/468 |
| 4,908,746 | 3/1990 | Vaughn | 364/147 |
| 4,918,593 | 4/1990 | Huber | 364/200 |
| 4,951,190 | 8/1990 | Lane et al. | 364/188 |
| 4,969,092 | 11/1990 | Shoter | 367/200 |
| 5,010,482 | 4/1991 | Keller et al. | 364/200 |

OTHER PUBLICATIONS

Chapman, "Manufacturing Control And Capacity Planning", 1987, Proceedings International Electronic Manufacturing Technology Symoposium, IEEE Catalog #87CH2483-6.

Chapman, "Knowledge Acquisition Of Manufacturing Descriptions", 1988 Proceedings, International Electronic Manufacturing Technology Symposium, IEEE Catalog #88CH2648-4.

Primary Examiner—Roy N. Envall, Jr.
Assistant Examiner—A. Bodendorf
Attorney, Agent, or Firm—Michael A. Waters; Joe E. Barbee

[57] ABSTRACT

A memory structure and related method for collecting and maintaining data descriptive of a multiplicity of interrelated process flows is disclosed. A complex memory structure includes job entities, operation entities, and process entities. Operation entities are subordinate to job entities, and process entities are subordinate to operation entities. These entities are represented by tables which are linked together to indicate their position in the hierarchy and their sequencing within a process flow. The process entities describe specific activities accomplished by an organization in achieving organizational goals. Typically, resources are either consumed or released, or both, during a process. Bill-of-resource tables are subordinate to process entities and populated with data which identify resources consumed by corresponding processes in the process flow. Attribute tables are subordinate to the resources listed in the bill-of-resources tables and populated with data which identify attribute limitations, durations for which resources are used, and quantities of resources consumed. Branch and condition entities are positioned between operation entities or process entities to initiate alternate process flows to be taken when specified conditions are met. In addition, condition entities may specify conditions to be met before including particular bill-of-resource and attribute tables within a process flow.

17 Claims, 11 Drawing Sheets

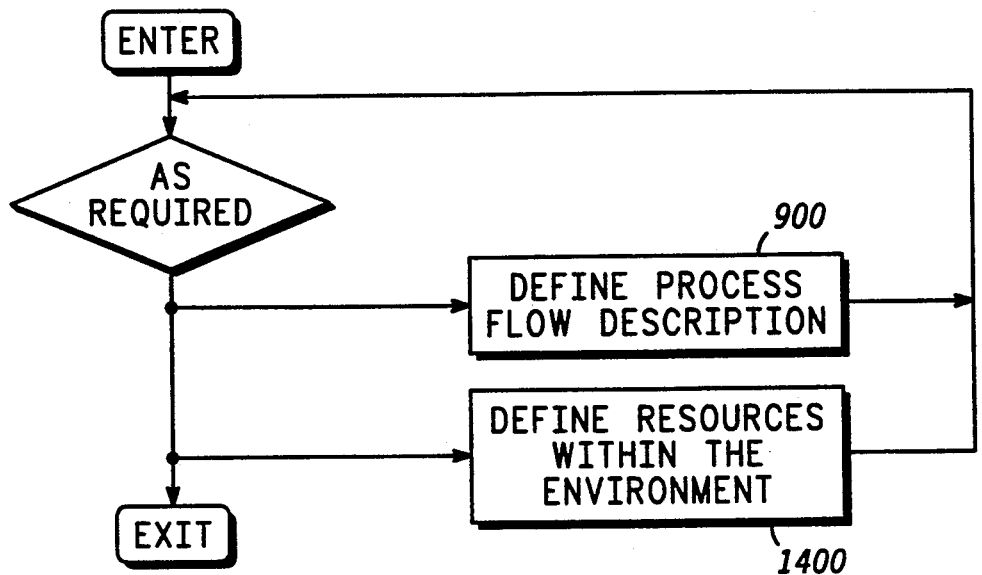
FIG. 8
FIG. 9
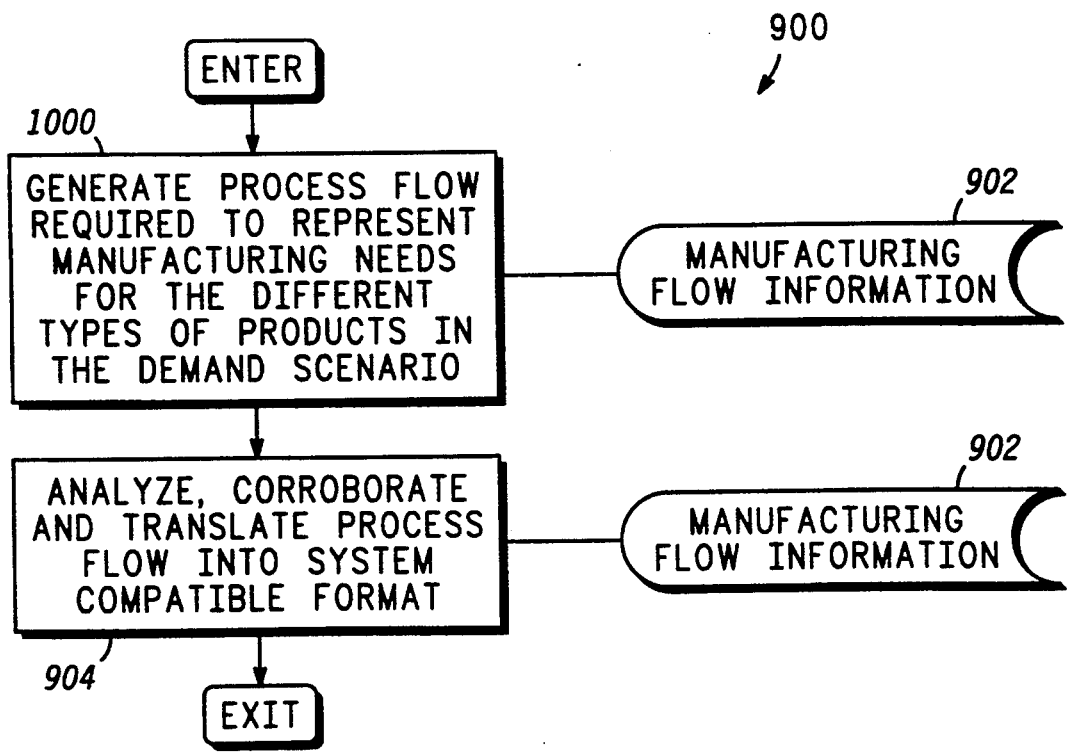

PROCESS FLOW INFORMATION MANAGEMENT SYSTEM

RELATED INVENTIONS

The present invention is related to the following, all of which are assigned to the assignee of the present invention:

1. U.S. patent application Ser. No. 342,774, filed Apr. 25, 1989, now U.S. Pat. No. 5,128,774, entitled "Means and Method for Managing Manufacturing or Other Resources," by William M. Chapman.
2. "Method of Controlling the Execution of Organizational Plans," filed on even date herewith, by William M. Chapman, et al.
3. "Resource-Lot Association Coordinator," filed on even date herewith, by William M. Chapman, et al.
4. "Manufacturing Control and Capacity Planning System," filed on even date herewith, by William M. Chapman.
5. "Method of Planning Organizational Activities", filed on even date herewith, by William M. Chapman, et al.

Each of the above-listed applications is incorporated herein by reference.

BACKGROUND OF THE INVENTION

1. Technical Field

The present invention relates generally to manufacturing, delivery of services, and other organizational activities about which data describing process flows are collected. More specifically, the present invention relates to a system for managing process flow information related to a multiplicity of interrelated organizational tasks.

2. Background Art

Organizations engage in activities to achieve organizational goals. For a manufacturing organization, such activities may relate to the manufacture of a product or of several products. For a provider of services, such activities may relate to the performance of a service or of many different services. In many organizations, and particularly in large or complex organizations, the manufacture of products and the performance of services require the completion of a large number of diverse activities in specific sequences relative to one another to achieve organizational goals. In order to manage these activities, organizations often perform information gathering and processing tasks related to describing the activities and their relative order. Such descriptions are referred to as process flows and may characterize the manufacturing of products, the performance of services, or other organizational goals. These process flows are useful in planning, simulating, and controlling realization of the described products and services.

Conventional systems for managing process flows are typically adapted to describe a relatively simple organization. Such simple organizations have no more than a few products or services to be described with process flows. Critical Path Method (CPM), Project Evaluation and Review Technique (PERT), and Material Requirements Planning (MRP) represent a few of the conventional techniques which support and manage process flows. When more complex organizations utilize such conventional systems, they are forced to duplicate or repeat usage of the systems for various products or services. As a result, the process flows for these products or services are independent from one another. In other words, process flows are constructed and exist in isolation of one another.

However, in reality different products and services of a complex organization tend to be interrelated with one another. For example, diverse products and services must compete to receive commonly used resources. Thus, these diverse products and services are related to one another through their demands for commonly used resources. Likewise, economies of scale may be realized by identifying and forcing roughly equivalent components of diverse process flows to be more similar. For example, if a "widget" product requires the use of one brand of red paint and a "gadget" product requires the use of another brand of red paint, two different brands of red paint must be purchased, inventoried, and managed. However, by recognizing the similarity between the paint requirements and forcing one of the products to use the other product's brand of paint, economies of scale are achieved in purchasing larger quantities of a single brand of paint and in inventorying only one brand of paint. Accordingly, diverse products and services are related through similar components between the products' and services' process flows.

Due to this interrelation between products and services of a complex organization, conventional systems fail to provide satisfactory process flows. Specifically, conventional process flow information management systems fail to promote standardization in characterizing process flows related to diverse organizational tasks. Consequently, opportunities for achieving economies of scale are missed. Moreover, process flow information quickly gets out of control, and organizations must expend large quantities of organizational resources to manage numerous process flows.

Furthermore, conventional systems for managing process flow information fail to satisfactorily account for the dispersion of expert knowledge within a typical complex organization. Thus, such systems inadequately permit a single person to create, modify, and otherwise manage, for the entire organization, many related process flows. Consequently, the expert's knowledge is often used inefficiently by the organization while non-experts manage flows related to areas beyond their expertise. Inaccurate and incomprehensive process flows result.

SUMMARY OF THE INVENTION

Accordingly, it is an advantage of the present invention that an improved system for managing process flow information is provided.

Another advantage of the present invention is that a structure is provided which promotes standardization of process flows utilized in accomplishing numerous diverse organizational tasks.

Yet another advantage is that the present invention provides a structure adapted to be used by numerous experts in collecting and maintaining information related to process flows.

Still another advantage is that the present invention promotes the collection and maintenance of accurate and comprehensive information describing numerous diverse organizational tasks.

Another advantage is that the present invention translates information about a specific manufacturing environment into a generic format for use by planners, simulators, and execution controllers.

The present invention is described herein using a set of related concepts. Accordingly, TABLE I, presented below, provides a glossary of terms and phrases which are used in describing the present invention. For purposes of the present invention, the normal usage of these terms and phrases is to be augmented by the definitions listed in TABLE I.

TABLE I

Task—any activity or group of ordered activities performed in an organization to achieve organizational goals. Tasks differ from one another if corresponding processes in the tasks are not substantially identical to one another. For example, different tasks result from incorporating small differences in an otherwise equivalent product, such as manufacturing red and blue widgets. Likewise, different tasks relate to services, such as diverse medical operations in which initial and final steps of the diverse operations are the same but intermediate steps are dissimilar. Moreover, different tasks may result from manufacturing identical products using different techniques, such as baking one widget in a first oven for one length of time and for a second length of time if another oven is used. Different tasks are characterized by different process flows, but the different process flows may include large quantities of identical information.

Process—one step in a plan or task. A process identifies an activity or group of activities which are performed on a product or service. A product or service may wait during a process before the activity is actually performed. While waiting, a resource or many resources may be consumed, an event which denotes an initial use of the resource. After completion of the activity, previously consumed resources may be released, an event which denotes the final use of the resource. Generally speaking, at least one resource is either consumed or released in a process.

Process flow—an ordered collection of processes which, when realized, achieves an organizational goal. A process flow may describe a plan for manufacturing an entire product or performing an entire service or an assortment of both. In addition, a process flow may describe a small portion of manufacturing for such products or performance of a small portion of such services. A process flow characterizes an organizational task.

Resource—a valuable commodity used or partially used in accomplishing an organization's goals for a product or service. A resource may itself be a service, such as human labor, or a tangible item, such as tools, equipment, transportation systems, and raw materials.

Attributes—parameters which define a specific configuration or quality of a resource. For example, an attribute of an oven may be temperature, and an attribute of a mixer may be a speed at which the mixer operates. If two products or services require different attribute capabilities of an otherwise sharable resource, the sharable resource may not be shared by the two products or services.

Capability—a value assigned to an attribute to describe a quantity or character exhibited by or required of a resource in a specific situation. If a resource attribute is temperature, a capability of the temperature attribute is a specific number of degrees. Likewise, if an attribute of a consumable inventory item, such as bolts, is quantity, then a specific number of bolts is a capability.

Consume—the initial dedication of a resource or portion of a resource for use in connection with the processing of one or more products and/or services. The resource portions consumed during a process cannot be used in connection with other products/services until they are later released. Some resources, such as raw materials, need never be released and therefore may never be usable in connection with other products/services.

Release—the giving up of a resource or portion of a resource previously consumed. Resources are released only at the end of a process. Once released, a resource may subsequently be consumed by another product and/or service or by the releasing product/service in a later-occurring process. For example, when a mixer has finished mixing a product, the mixer is released. Thereafter, the mixer may be used with other products.

Data element—a portion of a memory structure configured in a specific arrangement by an act of writing or programming so that the structure thereafter conveys information by the converse act of reading. A data element describes, characterizes, or identifies an aspect of an organization by virtue of the information conveyed by the data element.

Table—an ordered collection of related data elements.

Memory structure—an ordered collection of related tables.

The above and other advantages of the present invention are carried out in one form by an improved apparatus which associates information descriptive of first and second interrelated organizational tasks so that standardization in characterizing process flows results. The apparatus includes first, second, and third process tables. Each process table includes data elements which describe its own one of corresponding first, second, and third processes. The first process is performed by both of the first and second tasks. However, the second process is performed in accomplishing only the first task, and the third process is performed in accomplishing only the second task. In addition, the first process table includes a first out-flow pointer data element. The apparatus further includes a branch table which is configured, through naming, location, or otherwise, to be identified by the first out-flow pointer data element. The branch table includes first and second condition data elements associated with second and third out-flow pointer data elements, respectively. The second and third out-flow pointer data elements are configured to identify the second and third process tables, respectively.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

FIG. 8 shows a flow chart of general modules performed by the present invention;

FIG. 9 shows a flow chart of general procedures performed by the present invention while defining a process flow description;

DETAILED DESCRIPTION OF THE PREFERRED EMBODIMENT

Figure 1:
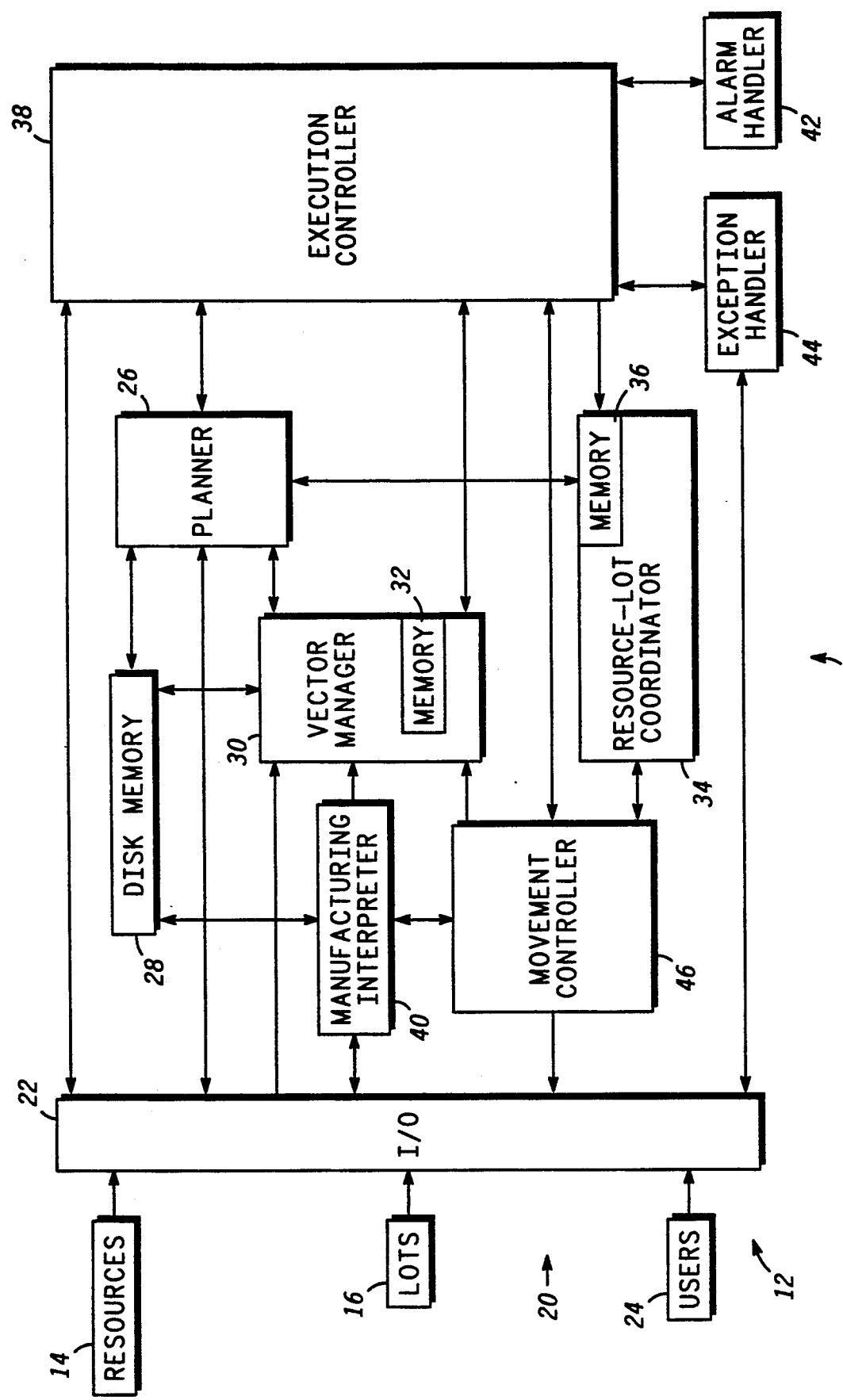
FIG. 1 shows a block diagram of a manufacturing or other organizational environment in which the present invention operates.

FIG. 1 shows a block diagram of a manufacturing or other organizational environment 10 in which a manufacturing control and capacity planning (MCCP) system 12 operates. The preferred embodiment of the present invention serves as a manufacturing interpreter component 40 of MCCP system 12, but is not limited to use exclusively in connection with this specific MCCP system 12. Generally speaking, MCCP 12 is concerned with allocating resources 14 (see TABLE I) to lots 16, which generally represent the products and/or services to which the goals of an organization are directed. MCCP system 12 can operate in connection with any number of resources 14 and any number of lots 16. However, as a practical matter the benefits obtained from utilizing MCCP system 12 and the present invention are expected to increase as the complexity of environment 10 increases. For example, MCCP system 12 is expected to serve an extremely beneficial role when environment 10 includes thousands of resources 14 and hundreds of lots 16.

MCCP system 12, including the present invention, is implemented using conventional computer hardware 20. MCCP system 12 is preferably implemented within a conventional distributed computer network, but may also be implemented within a single conventional computer. Within a distributed computer system, computer 20 may distribute the processing requirements of the separate components, such as the present invention (discussed below), of MCCP system 12 away from one another so that these separate components can simultaneously operate while communicating with one another through messages. The distribution of computing tasks improves the timeliness of information processing by allowing each component to perform its functions in parallel with the operation of the other components of computer 20.

An input/output (I/O) section 22 of computer 20 provides conventional devices for interfacing computer 20 to the physical world. Thus, section 22 includes conventional printers, video terminals, light pens, and other information-passing devices. MCCP system 12 uses section 22 to provide information to human agents or users 24 of environment 10 so that they may identify, define, and manipulate lots 16 and resources 14 and so that they may cause lots 16 to be processed in accordance with the information. Furthermore, I/O section 22 may include sensors, controllers, robots, and the like, which allow a direct automated interface between MCCP system 12 on one side and resources 14 and lots 16 on the other, without the intervention of users 24. For the purposes of the present invention, a video I/O terminal of section 22 is the primary device through which information is transferred between users 24 and interpreter 40.

A planner component 26 of MCCP system 12 couples to I/O section 22 and aids an expert user 24 in formulating a plan for manufacturing or realizing a lot 16. An expert is any person who is familiar with the processes and resources needed to transform the lot 16 into a finished product. Each environment 10 will have unique plans for transforming its lots 16 into finished products.

Generally speaking, a plan specifies a series of processes (see TABLE I) which must be performed in order to transform a lot 16 into a finished product. In addition, the plan specifies those ones of resources 14 which are needed to carry out the plan and tentative timing data which define when specific processes should take place. At the planning stage, a lot 16 is merely planned and not activated in environment 10. In other words, a plan for producing a lot may have been made, but no work in progress has been started to accomplish the plan. The plan is retained in a disk memory 28, or other type of mass storage memory device, which couples to planner 26. Planner 26 is discussed in more detail in the above-discussed "Method of Planning Organizational Activities" patent reference.

A vector manager 30, which includes a relatively fast access, read/write memory 32, such as conventional RAM memory, couples to planner 26, disk memory 28, and to I/O section 22. Vector manager 30 operates in real time to specify, maintain, and otherwise control the mortgaging of, or commitments to using, future resource capabilities for use with lots 16. Vectors and vector manager 30 are described in more detail in the above-discussed "Means and Method for Managing Manufacturing or Other Resources" patent reference.

A resource-lot coordinator 34, which includes a relatively fast access, read/write memory 36, such as conventional RAM memory, couples to vector manager 30 and to planner 26. Coordinator 34 operates in real time to maintain a dependency memory structure within memory 36 that informationally links resources 14 with lots 16. Thus, coordinator 34 records and manages the allocations of resources 14 to the lots 16 which have been started as work-in-progress. This managing of allocations includes keeping track of all timing data needed to characterize the allocations. In addition, coordinator 34 is configured to identify dependencies resulting from these allocations, and to organize the allocations accordingly. Coordinator 34 is discussed in more detail in the above-discussed "Resource-Lot Association Coordinator" patent reference.

An execution controller 38 simulates the operation of environment 10 based on information maintained by vector manager 30 and coordinator 34. On the basis of these simulations, plans are cooperatively controlled in real time to optimize actual resource-lot allocations in environment 10. Controller 38 uses a plan as a baseline for desired organizational performance, and continually manipulates virtual allocations in response to deviations in the plans so that actual manufacturing execution will closely mimic the original plans or organizational goals upon which the original plans were based. Execution controller 38 Is described in more detail in the above-discussed patent reference entitled "Method of Controlling the Execution of Organizational Plans."

The manufacturing interpreter 40 couples to I/O section 22, vector manager 30, and disk memory 28. The process flow information management system of the present invention serves as interpreter 40. However, the present invention need not be limited to use in connection with manufacturing. Rather, interpreter 40 may serve a valuable role when lots 16 are pure services, a mixture of products and services, or other organizational goals. Vector manager 30 initializes its internal knowledge with information provided through interpreter 40.

Interpreter 40 translates data descriptive of a specific environment 10 and specific resources 14 therein into a generic form, which is compatible with the components of computer 20. This translation occurs interactively with input from an expert user 24. Moreover, interpreter 40 operates in a manner, and creates memory structures specifically configured, so that standardization in process flow description and comprehensiveness in data collection is promoted. The standardization in process flow description is advantageous in managing or otherwise controlling vast quantities of interrelated process flows. The comprehensiveness is advantageous in obtaining sufficient data concerning environment 10 so that accurate and realistic simulation, planning, and product realization control result from this data. Manufacturing interpreter 40 is discussed in more detail below in connection with FIGS. 2-15.

An alarm handler 42 provides a timing function for execution controller 38. This timing function instructs execution controller 38 to reassess simulations of environment 10 or to automatically cause specified ones of lots 16 to move based on the lot's plan. An exception handler 44 evaluates deviations identified by execution controller 38 during simulations of environment 10 or by user 24 or another external source through I/O section 22. The evaluation is customized for particular environments 10 by an expert user 24. After evaluation, a resolution of the deviation is returned to execution controller 38 for continued simulation and control of those lots 16 and resources 14 for which deviations were indicated.

A movement controller 46 couples to I/O section 22, vector manager 30, coordinator 34, execution controller 38, and interpreter 40. Movement controller 46 generally controls the movement of lots 16 within environment 10. Initiating information which causes such movement may originate from execution controller 38. Appropriate movement instructions and movement feedback information are passed through I/O section 22 to control lots 16. In addition, this movement information and associated feedback may operate as the signaling events which cause MCCP system 12 to progress. For example, this movement information may serve as feedback information to interpreter 40 to help improve process flow descriptions (discussed below in connection with FIGS. 2-13). Likewise, mortgage and allocation data managed in memories 32 and 36 may be updated as a result of such movement information, and future simulations may be initiated as a result of such movement information.

Figure 2:
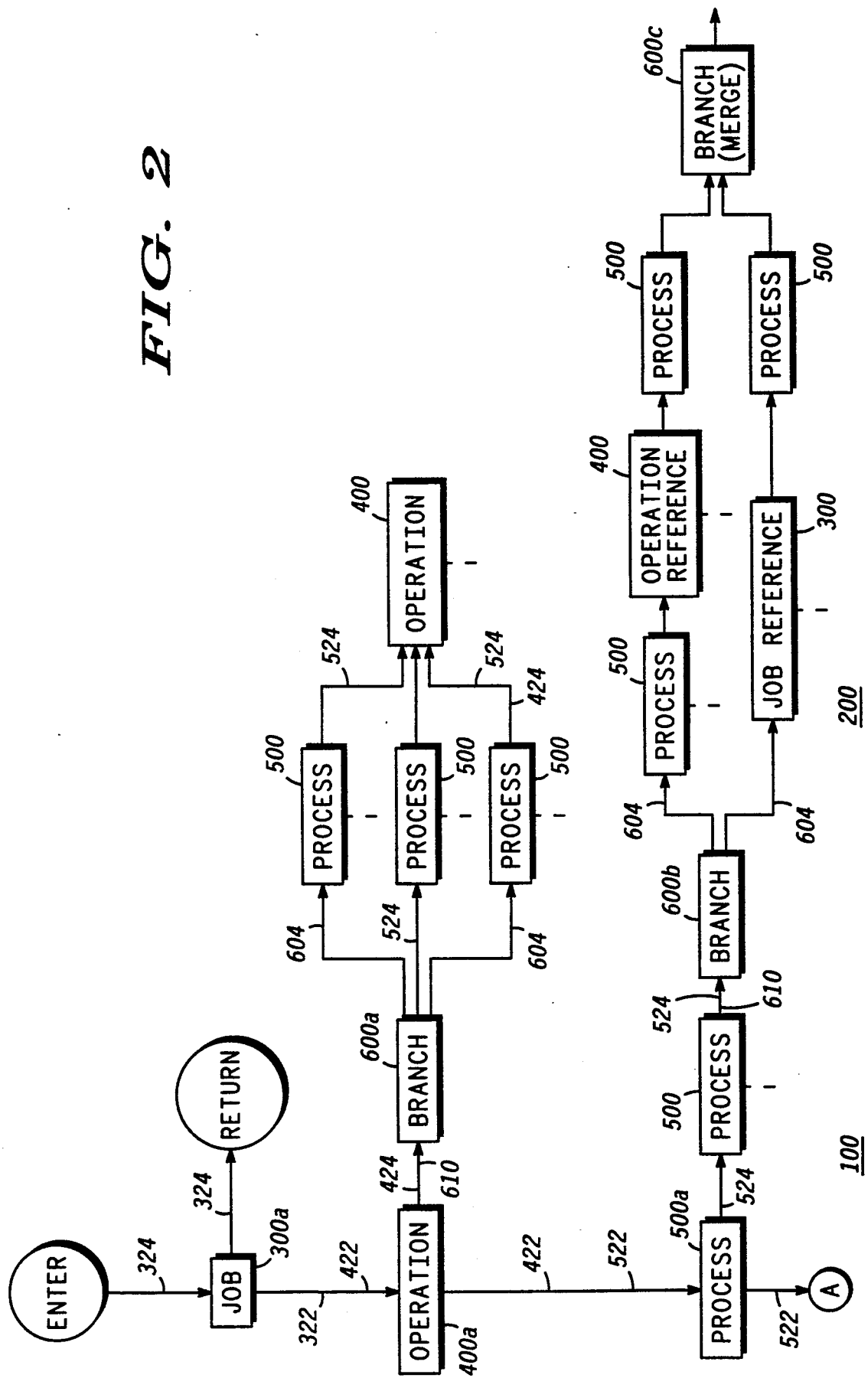
FIG. 2 illustrates an upper section of an exemplary memory structure constructed in accordance with the teaching of the present invention.
Figure 7:
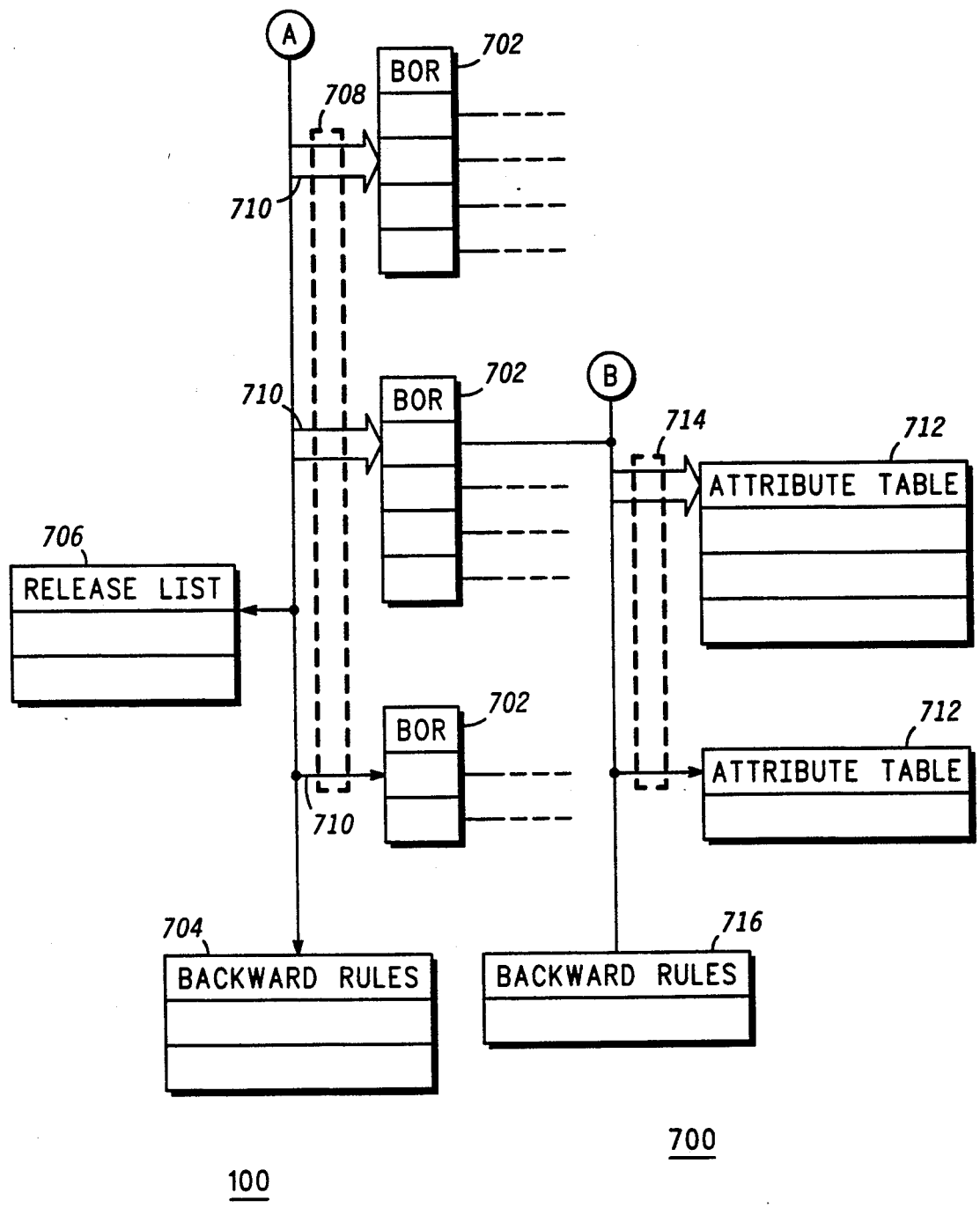
FIG. 7 illustrates a lower section of an exemplary memory structure constructed in accordance with the present invention.

FIG. 2 illustrates an upper section 200 of an exemplary memory structure 100 constructed by operating interpreter 40. FIG. 7 (discussed below) shows a lower section 700 of memory structure 100. The terms "upper" and "lower" refer to a relative logical relationship between component memory structures, which is discussed below, and not to any particular physical relationship. The precise memory structure illustrated in FIGS. 2 and 7 represents an example of a single memory structure configured in accordance with the present invention to represent generic process flows for interrelated organizational tasks. Those skilled in the art will understand that this specific example may advantageously be uniquely modified to accurately characterize a particular organization 10 and situation to which it is applied. Memory structure 100 is maintained within disk memory 28 (see FIG. 1) and populated with data collected from a user 24 through a video I/O terminal 22 (see FIG. 1). Thus, interpreter 40 reflects memory structure 100 at video I/O terminal 22 so that user 24 may access such data.

As shown in FIG. 2, memory structure 100 includes a multiplicity of tables or entities. In the preferred embodiment, each of these tables is configured in conformance with one of four generally distinct forms. Thus, each table characterizes either a specific job entity 300, a specific operation entity 400, a specific process entity 500, or a specific branch entity 600. Memory structure 100 may include any number of entities 300, 400, 500, or 600. While multiple versions of any single entity share a common form, those skilled in the art will understand that each of the multiple versions may differ from one another by the data stored therein. The example memory structure shown in FIGS. 2 and 7 depicts numerous relationships between entities 300, 400, 500, and 600.

The relative scope of job, operation, process and branch entities may be appreciated by considering a possible process flow related to a hypothetical complex medical operation. The overall medical operation may be subdivided into three sequentially arranged jobs. The first job may relate to opening, the second job related to the nature of the medical operation (i.e. heart surgery or the like) and the third job related to closing. Each job will consist of its own set of operations. For example, the first or opening job may include operations for initial testing, patient preparation, anesthesia, and initial surgical steps. Each operation will consist of its own set of processes. For example, the anesthesia operation may include specific discrete processes for performing final testing, setting up anesthesia equipment, and administering anesthesia.

Each process requires its own resource configuration. For example, the final testing and setting up of equipment processes in the above-discussed medical operation example may require a technician and the presence of the required equipment and drugs. Likewise, the final testing and administering anesthesia processes may require the presence of an anesthetist. A branch entity characterizes alternate process flow paths, each of which may be appropriate in specific situations. For example, one set of processes for setting up anesthesia equipment and administering anesthesia may be appropriate when the patient weighs less that a predetermined weight or is less than a predetermined age, such as 100 pounds or 16 years, respectively, while another set of corresponding processes may be appropriate when the patient weighs over that predetermined weight or is older than that predetermined age. Thus, a branch entity may be used to characterize the different anesthesia processes used when the patient is a child versus when the patient is an adult. Other processes in the overall medical operation may, but need not, be the same for use in connection with adults and children.

Job, operation, and process entities 300, 400, and 500, respectively, are related to one another within a hierarchy. Job entities 300 reside at the top of this hierarchy, and operation entities 400 are subordinate within the hierarchy to job entities 300. Process entities 500 are subordinate within the hierarchy to both job entities 300 and operation entities 400. Thus, FIG. 2 illustrates operation entities 400 beneath their parent job entities 300, and process entities 500 beneath their parent operation entities 400.

Figure 3:
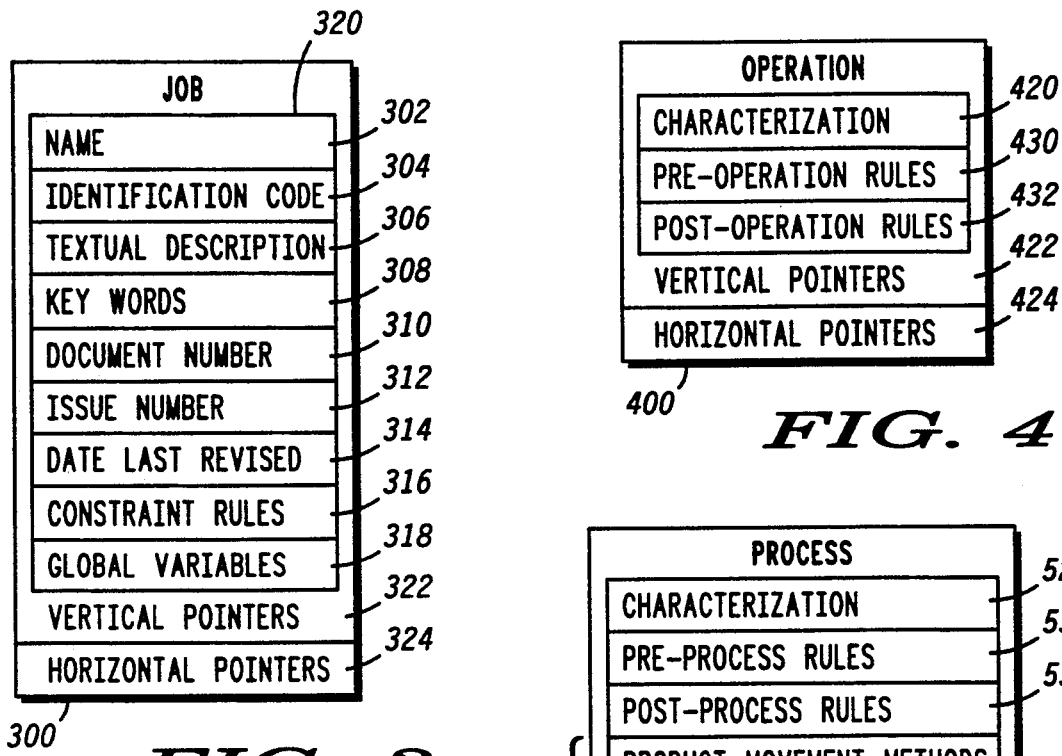
FIG. 3 shows a job table constructed in accordance with the teaching of the present invention.

FIG. 3 shows the memory structure form utilized by the preferred embodiment of the present invention for a job entity 300. Each of the job entities 300 shown in FIG. 2 exhibits substantially the same form, but the various job entities 300 may differ from one another due to different data stored therein. Job entity 300 includes a collection of related data elements. For example, a name data element 302 includes textual data to be associated with the job entity 300. When interpreter 40 reflects job entity 300 at video I/O terminal 22, entity 300 appears as a job entity icon, and the job name appears within the icon.

Job entity 300 additionally includes an identification code data element 304. Interpreter 40 uses conventional techniques to assign a unique number to element 304 when job entity 300 is created by user 24. Thus, names described by name data element 302 of different job entities 300 may be the same, and interpreter 40 distinguishes such different job entities 300 from one another using identification code data element 304.

A textual description data element 306 of job entity 300 includes textual data received from user 24. Such textual data allows user 24 to make editorial comments and notes concerning the specified job entity 300. Likewise, a key words data element 308 retains key words supplied from user 24. Interpreter 40 may use these key words in searching an entire database of which memory structure 100 is a part for generalized process flows. A document number data element 310, an issue number data element 312, and a date last revised data element 314 collectively retain data which permit conventional document control techniques to be applied to the process flows described in memory structure 100.

A constraint rules data element 316 retains data which identify user-specified rules that apply to the specified job entity 300. Such rules are typically useful in planning and simulating environment 10. They take the form of a formula or set of conditions which a planner or simulator must satisfy in making plans or in simulating environment 10. Moreover, the above-discussed hierarchy forces such rules to apply to each operation and process entity 400 and 500, respectively which is subordinate to the specified job entity 300. A global variables data element 318 retains data which defines variables that are used throughout the specified job entity 300. Such variables may be used in evaluating rules and conditions in subordinate entities and in passing parameters between various subordinate entities. Thus, such variables are usable through each operation and process entity 400 and 500, respectively, which is subordinate to the specified job entity 300.

As shown in FIG. 3, data elements 302-318 are collectively referred to as characterization data elements 320. Generally speaking, characterization data elements 320 describe a job to be performed in environment 10 to achieve organizational goals. A single specific job description is not an important feature of the present invention; job descriptions will vary from activity-to-activity. Rather, user 24 defines the job in accordance with the needs of environment 10. Characterization data elements 320 do not specify specific activities or resources required to accomplish the job. Such specification is left for subordinate entities. Job entity 300 is linked to such subordinate entities through vertical pointers data element 322. FIG. 2 shows a linkage through element 322 from a job entity 300a to a subordinate operation entity 400a.

As shown in FIG. 3, job entity 300 also includes a horizontal pointers data element 324. Horizontal pointers data element 324 defines linkages to job, operation, or process entities which are horizontally compatible with job entity 300. Unlike the vertical linkages discussed above, horizontal linkages do not conform to any particular hierarchial structure. Thus, any of job, operation, and process entities 300, 400, and 500 may horizontally link to any of a job, operation, or process entity. Generally speaking, horizontal pointers data element 324 defines sequencing between the linked entities. In other words, as shown in FIG. 2, horizontal pointers data element 324 indicates that job entity 300a occurs immediately after an entry entity, and immediately before an entity to which process flow is returned after execution of job 300a. User 24 specifies horizontal pointers data element 324 to characterize process flow for particular processes, and this specification occurs in connection with the definition of the entry and return entities (see FIG. 2).

Figure 4:
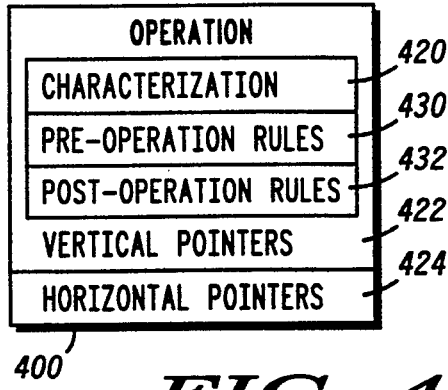
FIG. 4 shows an operation table constructed in accordance with the teaching of the present invention.

FIG. 4 shows the memory structure form utilized by the preferred embodiment of the present invention for an operation entity 400. Each of the operation entities 400 shown in FIG. 2 exhibit substantially the same form, but the various operation entities 400 may differ from one another due to different data stored therein. As with job entity 300, operation entity 400 includes a collection of related data elements. For example, characterization data element 420 stores characterization data which are similar in nature to the characterization data stored in data element 320, discussed above in connection with FIG. 3. Of course, the data stored in element 420 characterize an operation entity 400 rather than a job entity 300.

Operation entity 400 additionally includes a pre-operation rule data element 430 and a post-operation rule data element 432. For purposes of the present invention, data elements 430-432 are similar in nature to constraint rules 316, discussed above in connection with FIG. 3. Thus, data elements 430-432 identify rules which relate to a specified operation entity 400. However, the pre-operation and post-operation rules may serve different purposes within MCCP system 12 (see FIG. 1). For example, execution controller 38 (see FIG. 1) may evaluate these rules as a lot 16 is actually being manufactured or otherwise realized within environment 10. A pre-operation rule may be evaluated at the beginning of an operation, and a post-operation rule may be evaluated at the end of the specified operation. Such rules may, for example, instruct the printing of a specified report or the updating of inventory at the specified point in a process flow.

A vertical pointers data element 422 and a horizontal pointers data element 424 serve functions for operation entity 400 analogous to functions served for job entity 300 by elements 322 and 324, respectively. Thus, vertical pointers data element 422 defines vertical linkages with the specified operation entity 400 within memory structure 100 while horizontal pointers data element 424 defines horizontal linkages with the specified operation entity 400 in memory structure 100. For convenience and speed in traversing memory structure 100, pointer data elements link entities both upwards and downwards for vertical linkages and forward and backward for horizontal linkages. Hence, as shown in FIG. 2, vertical pointers data element 422 of operation entity 400a may describe linkages both to job entity 300a and to process entity 500a.

Figure 5:
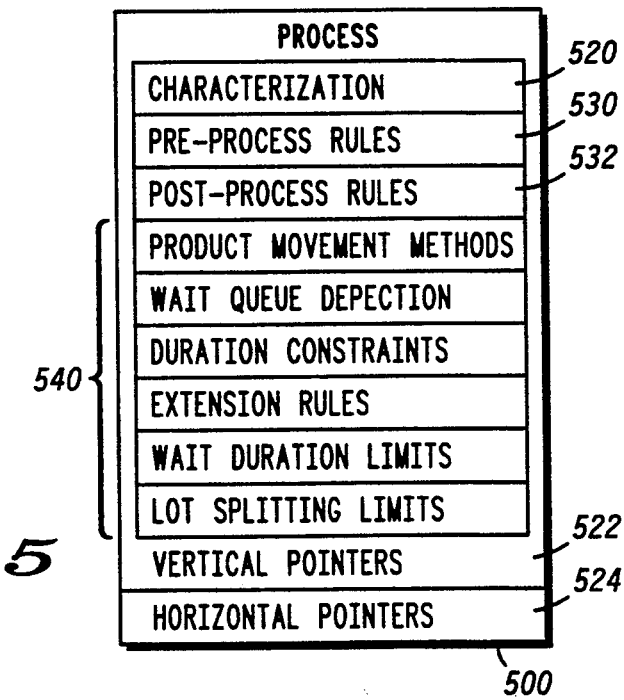
FIG. 5 shows a process table constructed in accordance with the teaching of the present invention.

FIG. 5 shows the memory structure form utilized by the preferred embodiment of the present invention for a process entity 500. Each of the process entities 500 shown in FIG. 2 exhibit substantially the same form, but the various process entities 500 may differ from one another due to different data stored therein. As with job and operation entities 300 and 400, process entity 500 includes a collection of related data elements. For example, characterization data element 520 stores characterization data which are similar in nature to the characterization data stored in data element 320, discussed above in connection with FIG. 3. Of course, the data stored in element 520 characterize a process entity 500 rather than a job entity 300. Likewise, pre-process and post-process rule data elements 530 and 532, respectively, identify rules similar to those identified by pre-operation and post-operation rule data elements 430–432. In addition, vertical pointers and horizontal pointers data elements 522 and 524, respectively, describe for a specified process entity 500 linkages similar to the vertical and horizontal linkages discussed above. The downward linkage specified by vertical pointers data element 522 identifies a node "A", which is discussed in more detail below in connection with FIG. 7.

In the preferred embodiment of the present invention, the actual process flow characterization occurs through process entities 500 and their subordinate entities. Thus, process entity 500 includes numerous additional system-specific process data elements 540. The specific items of data are not important to the present invention, other than to recognize that process entity 500 provides process data elements 540 for storage of data related to processes.

Accordingly, the hierarchical nature of entities 300, 400, and 500 promotes standardization of process flows within environment 10. For example, a first user 24 may have product level expertise and be able to specify that, for example, a job characterized by job entity 300a (see FIG. 2) is required to accomplish a particular organizational task. However, this first user may not possess expertise related to the details required in accomplishing this specific job. Accordingly, this first user may specify a process flow to accomplish the particular organizational task with reference only to the job which job entity 300a characterizes. Job entity 300a references a standardized job which process flows may incorporate simply by reference.

With further reference to this example, a second user 24 may possess expertise related to accomplishing the job generally specified by job entity 300a. This second user 24 may then create and maintain the process flow for this job by specifying the process entities 500 that this job requires. As a result, the expertise of this second user 24 may be utilized by the first user 24, and the first user 24 need not manage a process flow beyond his or her level of expertise. Likewise, the second user 24 need not manage a process flow beyond his or her level of expertise. The operation level adds an additional level of standardization which may be imposed between the job and process level when required. Thus, any job may be composed of operations, and each operation is composed of its own processes.

Figure 6:
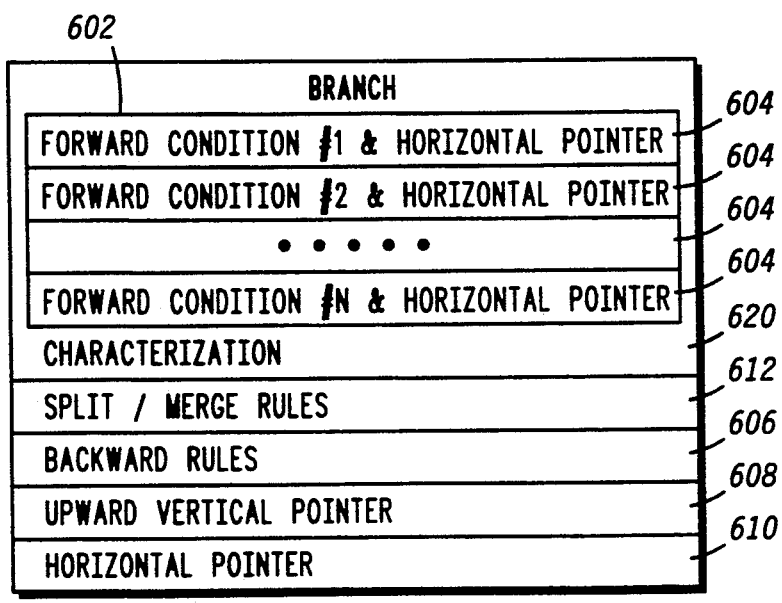
FIG. 6 shows a branch table constructed in accordance with the teaching of the present invention.

In order to promote standardization, the present invention provides another tool which allows a single entity to characterize a diverse number of process flows or potential process flows. Specifically, branch entity 600 allows characterization of alternate process flows and merging process flows. FIG. 6 shows the memory structure form utilized by the preferred embodiment of the present invention for a branch entity 600. Each of the branch entities 600 shown in FIG. 2 exhibit substantially the same form, but the various branch entities 600 may differ from one another due to different data stored therein.

Branch entity 600 may be used to describe alternate process flow paths, to describe splitting a lot, to describe merging a previously split lot back together, to provide for rework, and the like. Branch entities 600a and 600b in FIG. 2 represent alternate processing branching entities because forward process flow travels from a single flow path to a plurality of potential alternate flow paths. Branch entity 600c in FIG. 2 represents a merge branch entity because a plurality of flow paths are combined in entity 600c before proceeding along a single subsequent flow path.

As with job, operation and process entities 300, 400 and 500, branch entity 600 includes a collection of related data elements. A forward flow section 602 of entity 600 includes a plurality of condition data elements 604. The number of condition data elements 604 included in branch entity 600 corresponds to the desired number of alternate process flows to be specified. Each of condition data elements 604 stores data which define a condition and a pointer which horizontally links the specified branch entity 600 to a subsequent or forward entity. Hence, a forward horizontal link is provided from the specified branch entity 600 for each of data elements 604. In addition, condition data elements 604 may each include data describing condition rule names and parameters to be passed to subsequent entities in the corresponding flow path. Of course, when branch entity 600 is used to describe a merge entity, such as entity 600c (see FIG. 2), only one condition data element 604 is needed.

The condition portion of data elements 604 represents a boolean logic statement, equation, or formula which may be evaluated to a "true" or "false" designation. Such boolean logic statements are well known to those skilled in the art of computer programming and are often used in "IF . . . THEN" type programming statements. When a condition is evaluated as being true, the forward horizontal linkage associated with the condition defines the process flow for that situation. This condition data is optional, and when branch entity 600 is used to describe a merge entity, such as entity 600c (see FIG. 2), the condition data is omitted or otherwise set to a default setting which always evaluates to be true.

When multiple ones of the conditions specified in forward flow section 602 are evaluated as being true, priority may be given by the present invention to the first-listed condition data element 604. However, branch entity 600 additionally includes a backward rules data element 606. Backward rules data element 606 identifies a rule which may operate to alter this assumed priority. Specifically, a backward rule represents an optimization rule. While forming a plan or conducting a simulation of environment 10 based upon a process flow which includes a branch entity 600, all branches of the product flow which have true conditions are evaluated. After such evaluations, a backward rule will suggest which one of the branches to select for the most desirable process flow path. For example, backward rules may specify taking "true" branches which yield a maximum capacity, a minimum wait duration, minimum resource utilization, earliest estimated completion time, and the like. Such rules are backward rules because, after evaluating multiple potential process flow paths, the process flow is traversed backwards to select the most desirable one of the multiple potential process flow paths. Typically, the evaluation of backwards rules is performed by planner 26 (see FIG. 1).

In the preferred embodiment of the present invention, branch entities 600 do not serve as parents of subordinate entities. Thus, entity 600 includes only an upward vertical pointer data element 608 to identify the operation or job entity within whose domain it belongs. Similarly, forward flow section 602 of branch entity 600 includes a plurality of forward horizontal pointers. Thus, a horizontal pointer data element 610 included in branch entity 600 identifies only a backward or previous entity or entities from which process flow originated before reaching the branch entity 600.

A data element 612 of branch entity 600 includes data which identify rules to apply in splitting or merging lots. This is optional data which is included only when needed. For splitting lots and for representing rework situations, the rule may specify quantities of product which must be reached before a product lot is split. For merging alternate flow paths together, the rule may specify a minimum quantity to be staged or a maximum wait time before the merged lots will proceed beyond the merge entity. Such rules need not relate to a specific lot and may relate to non-specific needs, such as maintenance and rework, which are merely predicted rather than scheduled.

FIG. 7 illustrates lower section 700 of memory structure 100. Lower section 700 couples to upper section 200 (see FIG. 2) through node "A", which couples to a parent process entity 500. Memory structure 100 includes a lower section 700 for each process entity 500 defined in upper section 200. Node "A" represents an entity or table within memory structure 100. In particular, node "A" operates in a similar manner as branch entity 600 in coupling its parent process entity 500 to various subordinate bill-of-resources (BOR) tables 702. In addition, node "A" couples the parent process entity 500 to a backward rules list 704 and a release list 706.

Node "A" includes conditional link section 708, which operates analogously to forward flow section 602 of branch entity 600. However, conditional link section 708 has no effect on process flow. Rather, conditional link section 708 operates to specify a BOR table 702 to utilize in connection with the parent process entity 500. Thus, conditional link section 708 includes a plurality of condition and corresponding pointer data elements 710.

When a condition evaluates to a "true" condition, a corresponding BOR table 702 is associated with the parent process entity 500. When multiple conditions are true in a given situation, either the first-listed condition is given priority, or this priority is overridden by the operation of a backward rule identified by backward rules list 704. Backward rules in the context of node "A" operate similarly to the backward rules identified by data element 606 in FIG. 6.

Each BOR table 702 includes data elements which identify resources 14 (see FIG. 1) that are consumed (see TABLE I) at the parent process entity 500. Additional data describing the identified resources are maintained in an inventory attribute information file, discussed below in connection with FIG. 15. BOR tables 702 are optional and are included only if resources are in fact consumed during the parent process. Likewise, release list 706 is a table which includes data elements identifying resources 14 that are released (see TABLE I) at the parent process entity 500. Release list 706 is also optional since a process may not in fact release any resource.

Each data element in a BOR table 702 additionally includes data which identifies a node "B" for that data element. Nodes "B" link the identified resource 14 to a corresponding attribute table 712. While not required, a plurality of attribute tables 712 may couple to node "B". As with node "A" discussed above, node "B" includes conditional links 714 and node "B" couples to a backward rules list 716. Conditional links 714 and backward rules list 716 operate to select one of the plurality of potential attribute tables 712. The selected one of attribute tables 712 will thereafter be utilized for process flow in planning and simulations.

Attribute table 712 includes data elements describing specific capabilities (see TABLE I) of the named resource 14. These specific capabilities are the ones required by the organizational task for which the parent process has been included in a process flow. Typical capabilities to be specified in attribute table 712 are duration, quantity, and character information. Moreover, such data may be specified in the form of a formula. For example, a global variable may be defined at the job level and populated during planning and simulation with a number representing the quantity of lots to be manufactured. Such a formula may specify that durations and consumption quantities are a function of this variable.

FIGS. 8-15 show flow charts which describe the operations performed by interpreter 40 (see FIG. 1) under the control of user 24 (see FIG. 1) in forming memory structure 100 (see FIGS. 2 and 7). FIG. 8 shows a flow chart of general modules performed by the interpreter 40. As shown in FIG. 8, user 24 selects whether to operate interpreter 40 to define a process flow description, as shown at module 900, or to characterize the resources 14 included in environment 10 (see FIG. 1), as shown at module 1400. Interpreter 40 preferably presents a menu to user 24 so that user 24 may select the desired module. No particular sequencing is implied between modules 900 and 1400, and user 24 may exit one and enter the other as desired.

FIG. 9 shows a flow chart of procedures performed by interpreter 40 during module 900, shown in FIG. 8. First, a procedure 1000 is performed to generate a process flow. As discussed above, a process flow characterizes the various activities required to meet a manufacturing or other organizational need. Moreover, this need may relate to a single task or to a multiplicity of interrelated tasks. Procedure 1000 generally forms memory structure 100 depicted in FIGS. 2 and 7. Memory structure 100 is formed in disk memory 28 (see FIG. 1) as a manufacturing flow information file 902. Memory structure 100 may be created from scratch or modified from an existing memory structure 100 by editing. Accordingly, procedure 1000 both receives data from file 902 and returns data to file 902.

After completion of procedure 1000, a procedure 904 analyzes file 902 for feasibility of use in connection with planning and manufacturing control. Procedure 904 searches for certain logic and syntactical errors in the process flow defined by file 902. For example, a resource, resource attribute, or resource attribute capability may be specified which is not compatible with information contained in the inventory attribute information file (discussed below). Alternatively, a timing rule may be incompatible with timing capability requirements of specified resources. Further, file 902 may fail to properly link processes, operations, and jobs together. In this situation, infinite processing loops may exist of various entities may be specified but never linked into the process flow. Such activities are roughly analogous to compiling and assembling activities which occur in connection with computer programming. Procedure 904 identifies such incompatibilities and others so that user 24 can take appropriate action.

In addition, procedure 904 converts data within file 902 into a machine compatible form. During this conversion, procedure 904 prunes the process flow tree structure defined by file 902 by removing unnecessary process flow paths from an output file generated by procedure 904. As discussed above, branching entities 600 and nodes "A" and "B" (see FIGS. 2 and 7) include conditional data elements which may, after evaluation in connection with a particular situation, indicate a "false" condition. Procedure 904 detects such "false" conditions to the maximum extent possible and removes the forward horizontal linkages and subsequent process flow paths which correspond to such conditions. The conversion and such pruning speeds processing by planners and simulators, and generally saves memory requirements within MCCP system 12. When procedure 904 indicates that a process flow network defined by its output file is feasible, module 900 is complete.

Figure 10:
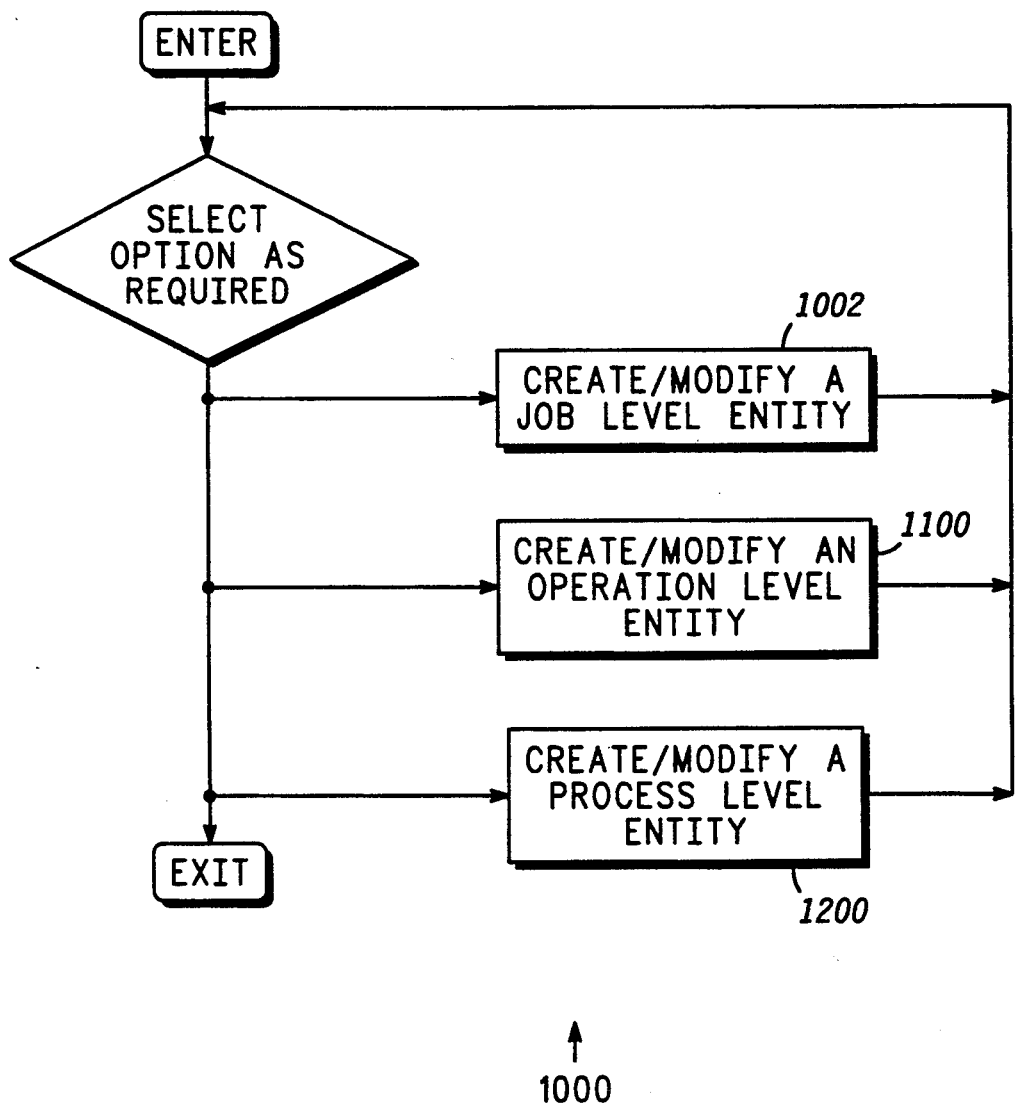
FIG. 10 shows a flow chart of procedures performed by the present invention to define process flow entities.

FIG. 10 shows a flow chart of procedure 1000, which is performed by interpreter 40 as shown in FIG. 9. As shown in FIG. 10, a user 24 chooses whether to operate interpreter 40 to create or modify a job level entity (procedure 1002), create or modify an operation level entity (procedure 1100), or create or modify a process level entity (procedure 1200). Job, operation, and process level entities were discussed above in connection with FIGS. 2-6. Interpreter 40 preferably presents a menu to user 24 so that user 24 may select the desired one of procedures 1002, 1100, and 1200. No particular sequencing is implied between procedures 1002, 1100, and 1200, and user 24 may exit one and enter another as desired. User 24 may cause interpreter 40 to perform any of procedures 1002, 1100, and 1200 as often as needed to make a desired product flow.

Each of procedures 1002, 1100, and 1200 operates to allow a user to supply data which interpreter 40 stores within memory structure 100 (see FIG. 2). The present invention contemplates the use of conventional database management techniques in collecting this data. Thus, procedure 1002 is not discussed in detail herein.

Those skilled in the art will recognize that a series of questions or an electronic form may be presented to a user 24 on video I/O terminal 22 to elicit the data needed to populate job entity 300 (see FIG. 3). In addition, a menu of existing job entities 300 saved in disk memory 28 (see FIG. 1) may be presented to user 24 so that user 24 may select one of these existing job entities 300 for modification or for use as a template in creating a new job entity 300.

Figure 11:
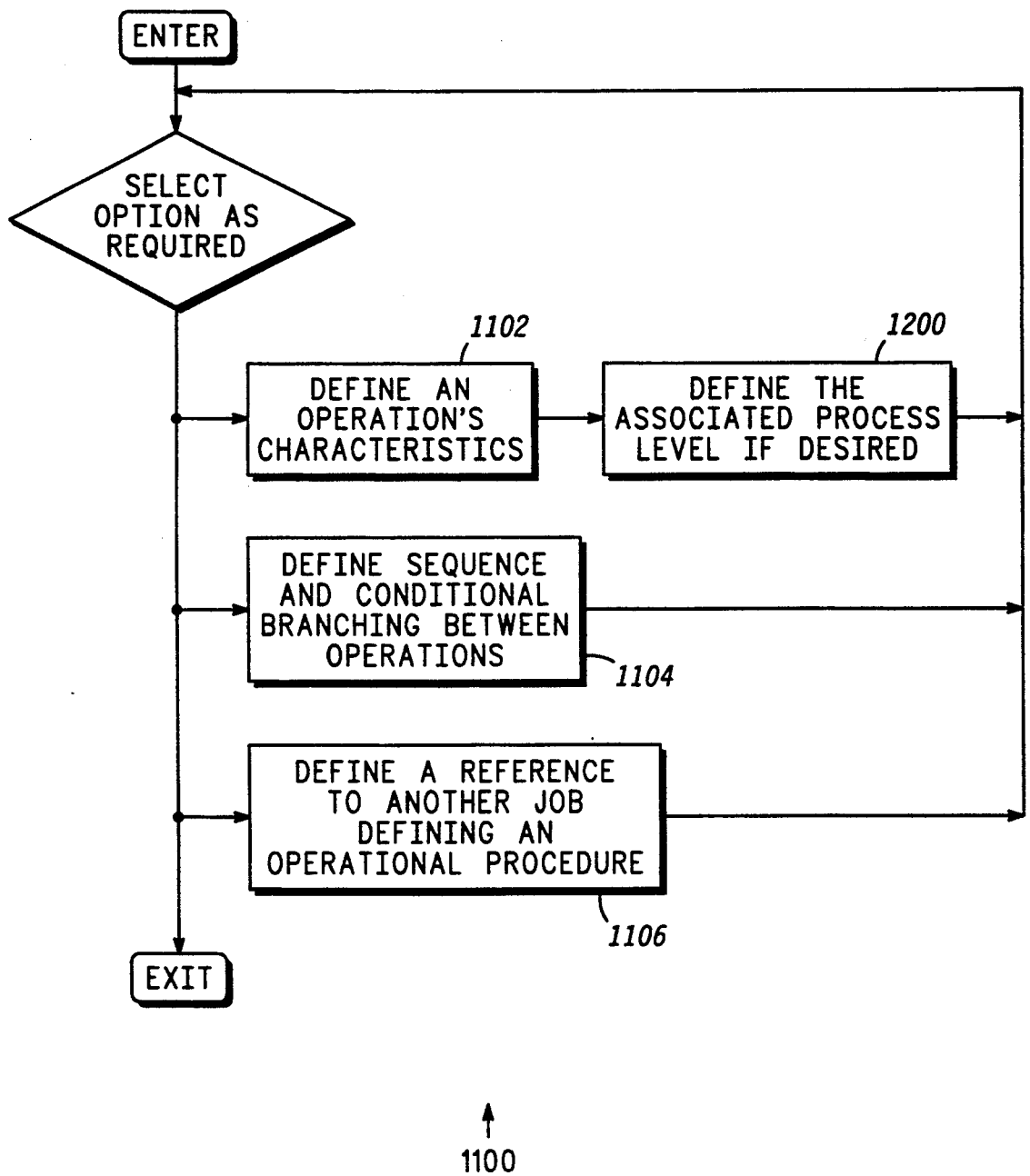
FIG. 11 shows a flow chart of procedures performed by the present invention to define an operation level process flow entity.

FIG. 11 shows a flow chart of procedure 1100, which is performed by interpreter 40 as shown in FIG. 10 to create or modify an operational level entity 400 (see FIGS. 2 and 4). As shown in FIG. 11, a user 24 selects whether to operate interpreter 40 to define an operation's characteristics (procedure 1102), define sequencing and conditional branching between operations (procedure 1104), or reference a job entity 300 (procedure 1106). Procedure 1100 preferably presents a menu to user 24 so that user 24 may select the desired one of procedures 1102-1106. No particular sequencing is implied between procedures 1102-1106, and user 24 may cause interpreter 40 to exit one and enter another as desired. User 24 may cause interpreter 40 to perform any of procedures 1102-1106 as often as needed to construct a desired operation level of a product flow.

Procedure 1102 utilizes conventional database management techniques to allow a user 24 to specify characterization and rule data elements 420 and 430-432, respectively, of an operation entity 400 (see FIG. 4). As discussed above, operation entities 400 may have associated subordinate process entities 500 (see FIGS. 2 and 5). After characterization of operation entity 400, procedure 1100 preferably allows a user 24 to directly access procedure 1200 (see FIG. 1000) so that the user 24 may create or modify such associated process entities 500. Accordingly, procedure 1200 may optionally be performed after procedure 1102.

Procedure 1104 permits a user 24 to specify linkages and branching between operation entities 400. In the preferred embodiment, procedure 1104 shows operation entities 400 to user 24 at video I/O terminal 22 as individual icons. The user 24 specifies linkages by moving a pointing device, such as a conventional mouse, between two of the icons. Procedure 1104 then converts the identified entities into pointers, and correspondingly populates vertical pointers data element 422 and horizontal pointers data element 424 (see FIGS. 2 and 4).

Whenever the user 24 specifies at least two forward linkages from a single operation entity 400, procedure 1104 automatically requests the user 24 to enter data which defines a branch entity 600 (see FIGS. 2 and 6). Alternatively, the user 24 may directly instruct procedure 1104 to begin collecting branch data. Procedure 1104 automatically supplies pointer data elements for branch entity 600 from linkage data entered by the user 24. However, the user 24 enters condition and rule data using conventional database management techniques.

Procedure 1106 permits a user 24 to name a job for inclusion within the operation level of the process flow. Preferably, procedure 1106 presents a list of existing job names to the user 24 at video I/O terminal 22. The user 24 may then select one of the existing names, and the corresponding job entity 300 (see FIGS. 2 and 3) is referenced at the indicated place in the operation level of the process flow. In addition, procedure 1106 permits user 24 to view characterization data elements 320 (see FIG. 3) for the listed job names to aid the user in selecting a job name.

Figure 12:
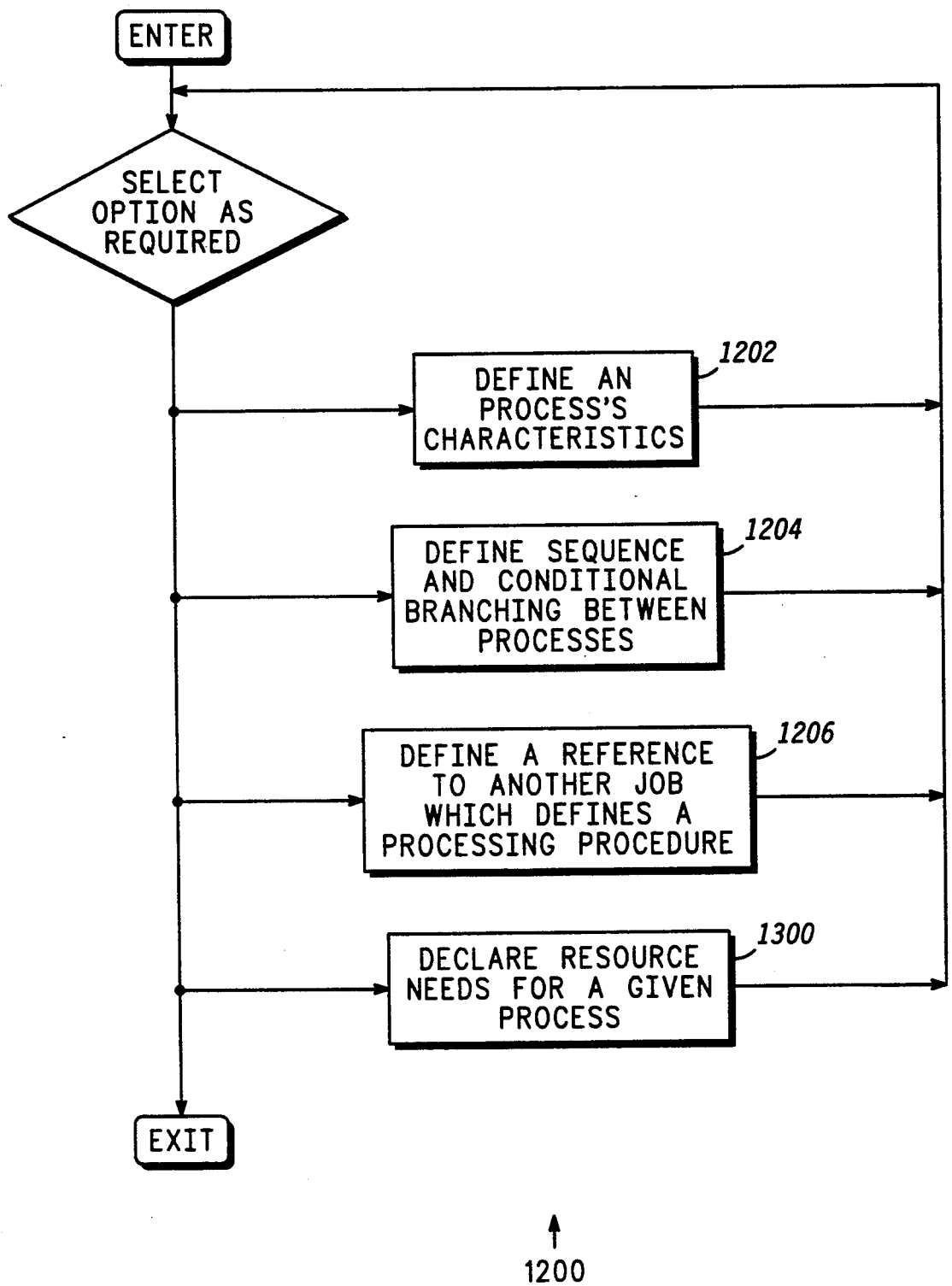
FIG. 12 shows a flow chart of procedures performed by the present invention to define a process level entity.

FIG. 12 shows a flow chart of procedure 1200, which is performed by interpreter 40 as shown in FIGS. 10 and 11 to create or modify a specified process level entity 500 (see FIGS. 2 and 5). As shown in FIG. 12, a user 24 selects whether to operate interpreter 40 to define a process's characteristics (procedure 1202), define sequencing and conditional branching between processes (procedure 1204), reference a job entity 300 (procedure 1206), or declare resource needs for the selected process entity 500 (procedure 1300). Procedure 1200 preferably presents a menu to user 24 so that user 24 may select the desired one of procedures 1202-1206 and 1300. No particular sequencing is implied between procedures 1202-1206 and 1300, and user 24 may cause interpreter 40 to exit one and enter another as desired. User 24 may cause interpreter 40 to perform any of procedures 1202-1206 and 1300 as often as needed to construct a desired process level of a product flow.

Procedures 1202-1206 are directly analogous to procedures 1102-1106, discussed above in connection with FIG. 11. Of course, procedures 1202-1206 operate to construct and link process entities 500 rather than operation entities 400.

Figure 13:
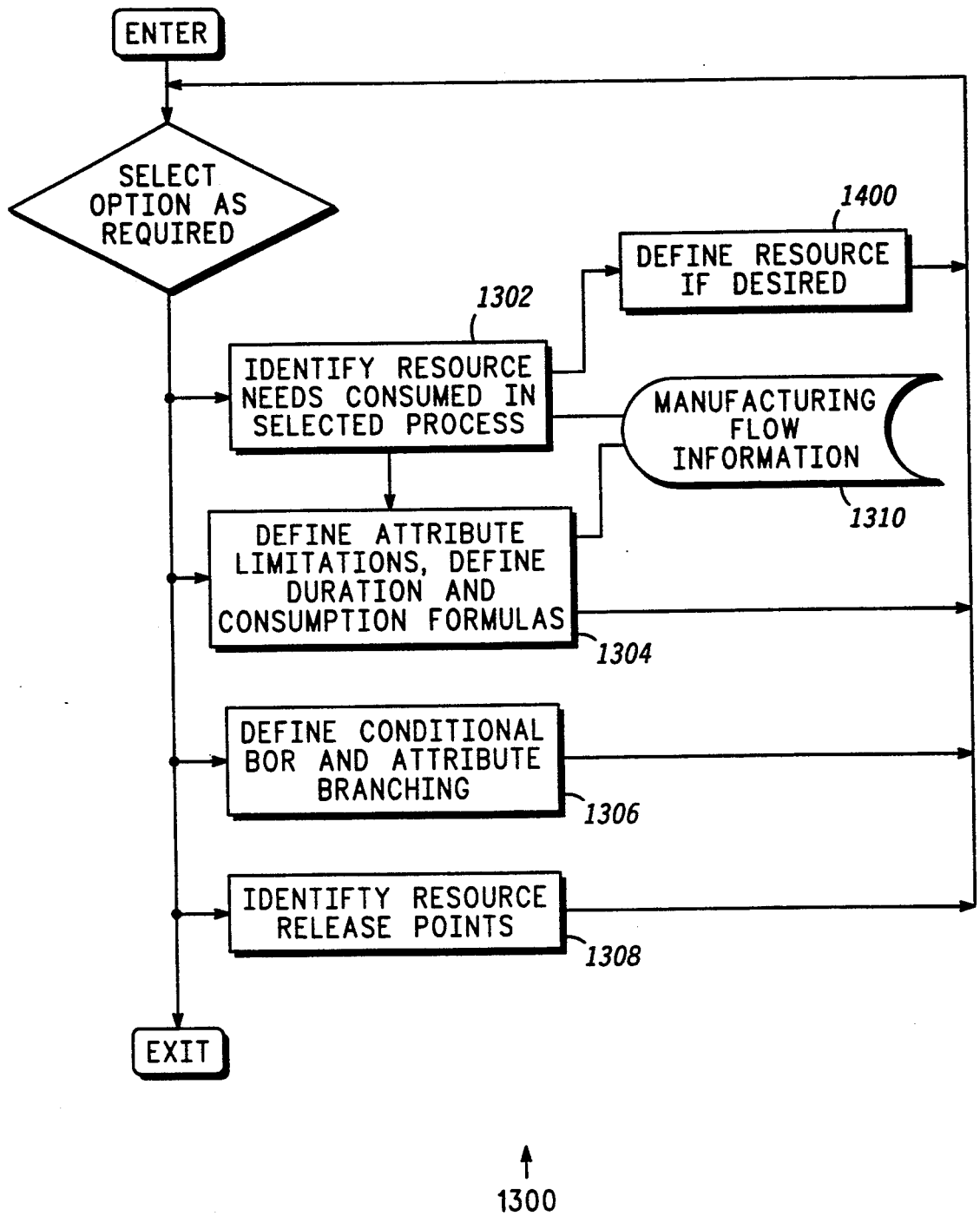
FIG. 13 shows a flow chart of procedures performed by the present invention in characterizing resources for a process level entity.

User 24 causes interpreter 40 to perform procedure 1300 to collect the data discussed above in connection with lower section 700 of memory structure 100 (see FIG. 7). FIG. 13 shows a flow chart of procedure 1300. As shown in FIG. 13, a user 24 selects whether to operate interpreter 40 to identify resources to be included in a BOR 702 (procedure 1302), define attribute and capability limitations of these identified resources (procedure 1304), define conditional BOR and attribute table branching (procedure 1306), or identify resources to be released (procedure 1308). Procedure 1300 preferably presents a menu to user 24 so that user 24 may select the desired one of procedures 1302-1308. No particular sequencing is implied between procedures 1302-1308, and user 24 may cause interpreter 40 to exit one and enter another as desired. User 24 may cause interpreter 40 to perform any of procedures 1302-1308 as often as needed to construct a desired process level of a product flow.

Procedure 1302 permits a user 24 to specify resources to be included in a bill-of-resources (BOR) table 702 (see FIG. 7). As discussed above, multiple BOR tables 702 may be formed, and conditional logic, specified below in procedure 1306, will operate to select one of the BOR tables 702 for various situations. The resources identified in procedure 1302 are those resources consumed (see TABLE I) at the specified process in the process flow. The identified resources are further characterized in a manufacturing flow information file 1310. Preferably, procedure 1302 accesses file 1310 to obtain characterizing resource information. Procedure 1310 then presents resource names to the user 24 so that the user 24 may simply select resources from such a menu. In addition, the menu may arrange resources in a hierarchy wherein specific resources are grouped together within common resource types. Thus, a user 24 may first select a resource type, then select more specific resources from the type if needed. Accordingly, the data elements of BOR tables 702 are populated with resource identifiers. If user 24 specifies a resource identifier which is not included in file 1310, procedure 1400 (see FIG. 8) may optionally be performed to allow user 24 to characterize such a resource.

Each resource identified in procedure 1302 is characterized as having attributes (see TABLE I). User 24 causes interpreter 40 to perform procedure 1304 so that significant ones of these attributes and their associated limitations may be specified. Once specified, procedure 1304 populates the data elements of attribute tables 712 with such specifications. File 1310 includes this information in a generic format, and procedure 1304 accesses file 1310 to obtain this information so that user 24 may select desired attributes and specify limitations. In addition, procedure 1304 allows user 24 to specify duration and consumption formulas for inclusion in attribute tables 712.

Procedure 1306 allows user 24 to define the rules and conditions for data elements 710 and 714 and for backward rules lists 704 and 716 (see FIG. 7). As discussed above, such rules are used to specify which of several BORs 702 and attribute tables 712 to utilize in any particular process flow. Procedure 1306 operates similarly to process 1104, discussed above in connection with FIG. 11.

Procedure 1308 allows user 24 to identify the specific resources which are released (see TABLE I) at the specified process 500 in the process flow. In the preferred embodiment, module 1000 (see FIG. 10) keeps track of resources consumed in a process flow and presents a menu of such resources to user 24. User 24 may select those resources from the menu which are being released. Then, procedure 1308 populates data elements of release list 706 (see FIG. 7) with resource identifiers corresponding to those resources.

Figure 14:
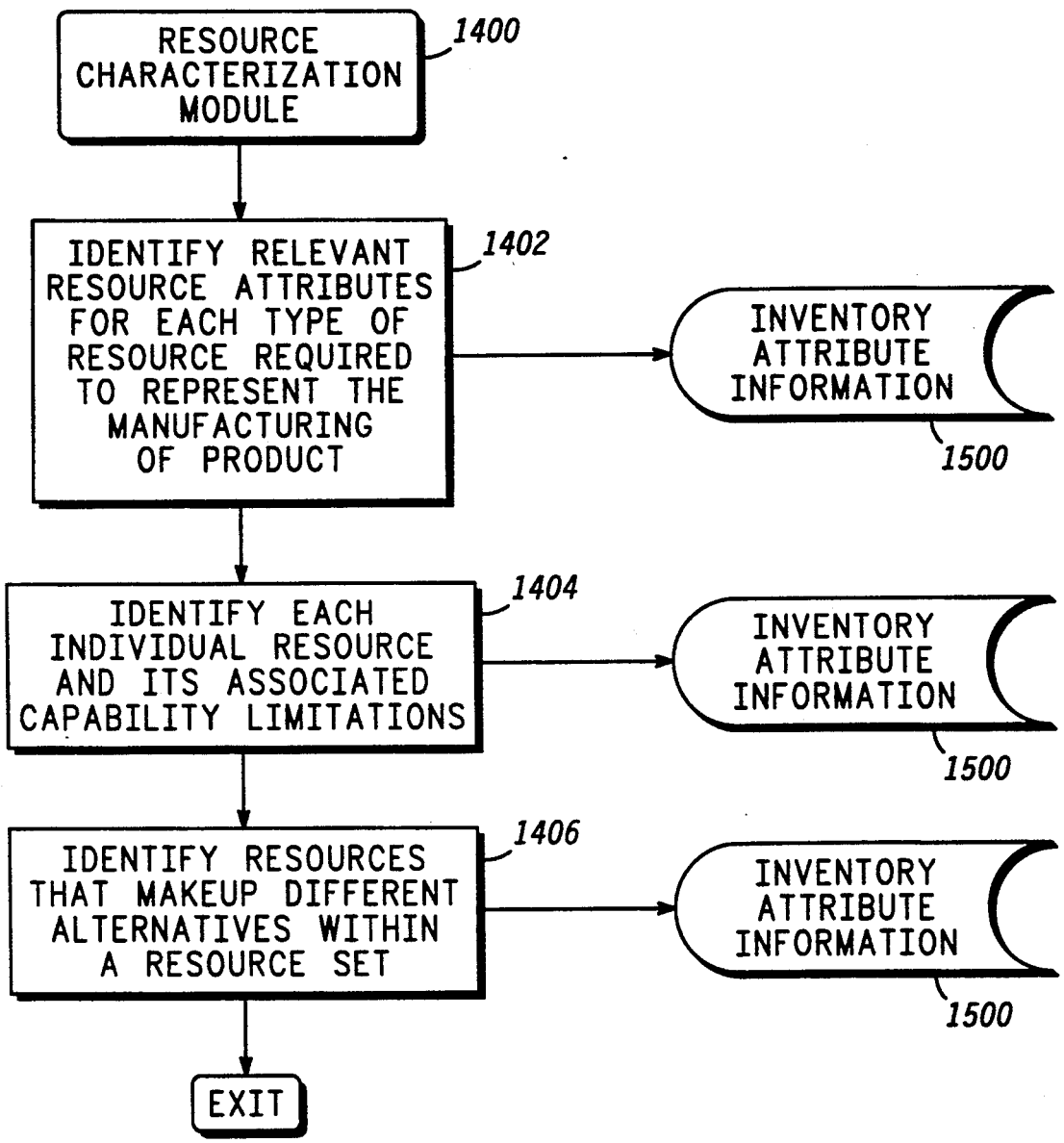
FIG. 14 shows a flow chart of procedures performed by the present invention to define resources for a manufacturing or other organizational environment.

With reference back to FIG. 8, a user 24 may operate interpreter 40 to collect information which characterizes resources within environment 10, as shown at module 1400. FIG. 14 shows a flow chart of resource characterization module 1400. Generally speaking, module 1400 collects information concerning resources 14, and this collection may be performed using conventional database manipulation techniques.

In a procedure 1402, manufacturing interpreter 40 prompts user 24 to identify types of resources 14 and relevant attributes for each type of the resources 14 to be included in a process flow. All attributes of these resource types which are relevant to actual processing of lots 16 are identified. Any number of attribute types may be characterized as being relevant. As an example, relevant attributes of an oven may include temperature range, number of shelves, temperature ramping rates, and the like.

Preferably, irrelevant attributes are omitted simply because they unnecessarily consume memory space. An example of an irrelevant attribute for an oven might be the exterior color of the oven. However, it is user 24, who is an expert on environment 10, that determines what an attribute is and whether or not a potential attribute is relevant. Furthermore, user 24 need not be extremely concerned about the difference between relevant and irrelevant attributes because identifying more attributes than may be currently relevant does not pose a serious problem.

Figure 15:
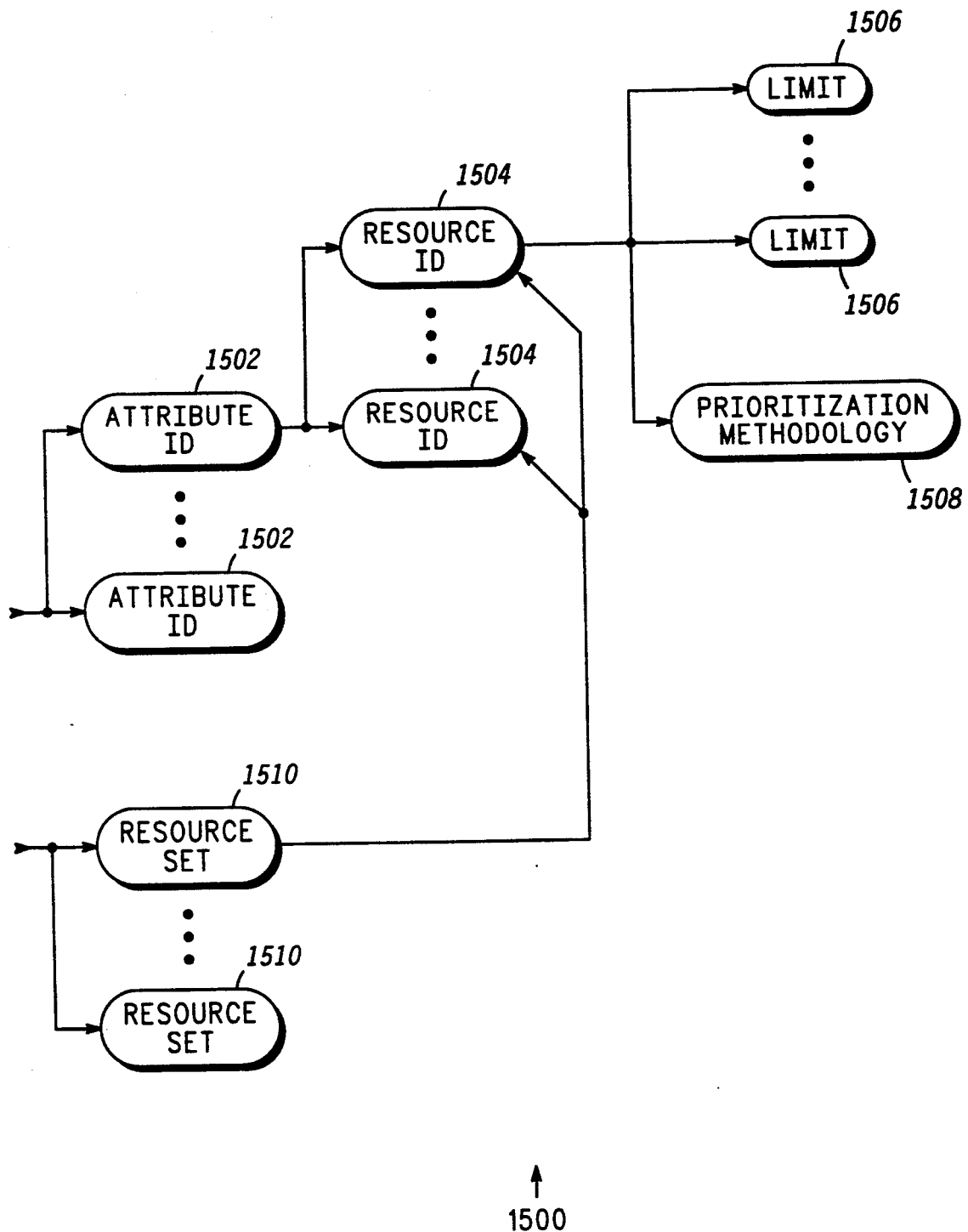
FIG. 15 shows a block diagram of an inventory attribute information file of the present invention.

Procedure 1402 places the attribute identification information gathered from user 24 into an inventory attribute information memory structure 1500, which is maintained as a file in disk memory 28 (see FIG. 1). FIG. 15 shows a block diagram of inventory attribute information memory structure file 1500. As shown in FIG. 15, structure 1500 may contain any number of attribute identifiers 1502.

Referring to both of FIGS. 14 and 15, in a procedure 1404 manufacturing interpreter 40 prompts user 24 to supply a resource identifier 1504 for each resource 14, capability (see TABLE I) limits 1506, and a prioritization methodology definition 1508 for the identified resource 14. Procedure 1404 transfers this information to memory structure 1500. Resource identifier 1504 represents a name of a specific resource 14. Capability limits 1506 describe the maximum and minimum capacities or other boundaries on the capabilities of the corresponding resource 14. For example, capability limits of a temperature attribute of a specific oven resource 14 may be upper and lower temperatures. A capability limit of a quantity attribute of a consumable raw material, such as bolts or welding rods, may be the maximum inventory that can be held in a particular bin. Prioritization methodology 1508 specifies whether to consider the corresponding resource 14 as being a static or dynamic resource in subsequent plans.

Memory structure 1500 associates any number, typically one or two, of capability limits 1506 with each resource id 1504. In addition, capability limits 1506 and their associated resource id 1504 are associated with an attribute id 1502. Thus, each attribute id 1502 has its own structure of resource ids 1504 and capability limits 1506. Of course, the same resource id 1504 may be associated with multiple attribute ids 1502.

In a procedure 1406, resource characterization module 1400 prompts user 24 to identify resources 14 which are included in resource sets 1510. Each resource 14 included within a resource set 1510 may be substituted for another without a significant effect on the processing of products or services. For example, environment 10 may include many push cart resources 14 for transporting work-in-progress from one location to another. All carts may be included in a single set. Thus, a particular process flow description BOR 702 (see FIG. 7) may specify use of a member of this set. Planners and simulators will then have great flexibility in allocating all carts. In addition, all carts of a single size may be grouped in their own set. Thus, a process flow description may specify the use of a cart from the set of all carts, a cart from the set of carts of a specific size, or a specific single cart. Generally, a user 24 will wish to identify as broad a set as possible to satisfy a demand of a lot 16. A more narrow specification of a resource than is necessary will unduly constrict potential plans and manufacturing control, and may lead to less efficient allocations of lots to resources.

As shown in FIGS. 14–15, procedure 1406 saves resource set identifiers 1510 in memory structure 1500. Any number of sets may be identified, and each set identifier 1510 is associated with its corresponding resources 1504. Procedures 1402–1406 need not be performed in any particular order within resource characterization module 1400.

In summary, an improved system for managing process flow information is provided. The system of the present invention promotes standardization of process flows. For example, the hierarchy of process flow entities permits such entities to be compiled and maintained separately from the various higher level organizational tasks which may require the process. Process flows for several of such tasks may easily incorporate separate, discrete process flow entities. Any changes in the separate entities will then automatically be incorporated in the overall task process flow.

Moreover, the conditional and branching entities included in the system of the present invention further promote standardization. Such entities permit specification of a great variety of alternate process flows to correspond to a corresponding variety of potential or actual organizational tasks. Such alternate process flows differ from each other only in the specific areas of process flow where differences are significant. For example, process flows for red and blue "widgets" may be identical, except for a single process flow entity in which the painting activity is defined. A branch entity may be used to direct flow in accordance with whether red or blue widgets are being manufactured. Alternatively, a single process entity may specify different BOR tables to identify the different colors of paint. Conditional data elements may be populated to cause selection of an appropriate BOR table.

In addition, the present invention provides a memory structure which matches and accommodates the diversity of expertise in a typical complex organization. Thus, different users may be responsible for different process flow entities, and such different process flow entities are managed and maintained separately from the flow descriptions which utilize them. In general, the present invention naturally causes process flow descriptions to reflect the expertise of the user generating them. Further, the present invention is open-ended so that collection of comprehensive data is encouraged. Moreover, through the structure imposed by the present invention, data descriptive of an organizational environment is configured in a generic format which may be used by planners, simulators, or realization controllers. Such planners, simulators, and realization controllers may then be adapted for use in connection with a wide variety of organizations.

The present invention has been described above with reference to a preferred embodiment and an exemplary memory structure. However, those skilled in the art will recognize that changes and modifications may be made in this preferred embodiment without departing from the scope of the present invention. For example, each of the above-described memory structures may include additional data elements which further help meet overall system needs. Moreover, many of the linking pointer data elements may be omitted in specific situations. Moreover, the specific modules and procedures, and their relationships to one another as described above may be substantially altered by those skilled in the art to achieve substantially the same functions. These and other changes and modifications which are obvious to those skilled in the art are intended to be included within the scope of the present invention.

What is claimed is:

1. A method of associating information comprising the steps of:

translating data descriptive of demand for resources into a generic form comprising said first, second, and third process tables;

constructing a first table, to store data descriptive of a first processes which is to be performed in accomplishing both of said first and second tasks;

constructing a bill-of-resources memory structure which includes a bill-of-resources table;

linking said bill-of-resources memory structure to said first table;

listing, in said bill-of-resources table, a plurality of initially consumed resources which are consumed in said first process;

constructing a second table, to store data descriptive of a second process which is to be performed after said first process in accomplishing only said first task;

constructing a third table, to store data descriptive of a third process which is to be performed after said first task in accomplishing only said second task;

linking said first data to said second data through first condition data;

linking said first data to said third data through second condition data, said first and second condition data operating to distinguish said first and second tasks from one another;

controlling a commitment to use of resource capabilities based on said first data, said second data, said third data, said first condition data and said second condition data; and performing the preceding steps using a computer, according to a set of predetermined instructions stored in said computer.

2. A method as claimed in claim 1 wherein said bill-of-resources memory structure includes a second bill-of-resources table, and said method additionally comprises the steps of:

defining a rule which operates to associate said bill-of-resources table with said first task and said second bill-of-resources table with said second task; and associating said rule with one of said first, second, and third tables.

3. A method as claimed in claim 1 additionally comprising the steps of:

constructing an attribute table, said attribute table including a data element describing resource attribute capabilities required of said initially consumed resources by at least one of said first and second tasks; and linking said attribute table to said bill-of-resources table.

4. A method as claimed in claim 3 additionally comprising the steps of:

constructing a second attribute table, said second attribute table including a data element describing alternate resource attribute capabilities required of said initially consumed resources by said at least one of said first and second tasks;

linking said second attribute table to said bill-of-resources table;

defining a rule which operates to associate said attribute table with said first task and said second attribute table with said second task; and associating said rule with said bill-of-resources table.

5. A method as claimed in claim 1 additionally comprising the steps of:

constructing a release list, said release list including a least one data element describing a resource released at the end of said first process by at least one of said first and second tasks; and linking said release list to said first table.

6. A method as claimed in claim 11 wherein each of said first, second, and third tables is associated with a job table, and said method additionally comprises the step of associating a unique identifier with said job table and said first, second, and third processes may be collectively referenced by said unique identifier.

7. A method for managing comprehensive information comprising the steps of:

providing a computer having a programmable memory;

constructing a first memory structure within said computer memory to store data descriptive of resources used in said plurality of interrelated tasks;

constructing a first table for storing data descriptive of a job to be performed by at least one of said tasks, said first table including a data element which describes resources released in accomplishing said plurality of interrelated tasks;

constructing a second table for storing data descriptive of a process to be performed by said at least one of said tasks, said process being a component of said job and representing an activity to be performed by said organization in accomplishing said at least one of said tasks;

linking said first and second tables together within said computer memory;

constructing a third table for storing data which identify at least one of said resources described by data included in said first memory structure, said at least one resource being consumed at said process;

linking said second and third tables together within said computer memory;

linking said third table to said first memory structure within said computer memory; and performing the preceding steps using said computer, according to a set of predetermined instructions stored in said computer.

8. A method as claimed in claim 7 additionally comprising the step of constructing a fourth table for storing data descriptive of an operation to be performed by said at least one of said tasks, said operation being a component of said job, and said process being a component of said operation.

9. A method as claimed in claim 7 wherein said process is performed by first and second ones of said plurality of tasks, and said method additionally comprises the steps of:

constructing a fourth table for receiving data descriptive of a second process to be performed by al of said plurality of tasks except for said first task, said second process being a component of said job;

constructing a fifth table for storing data descriptive of a third process to be performed by all of said plurality of tasks except for said second task, said second process being a component of said job;

linking said second table to said fourth table within said computer memory;

linking said second table to said fifth table within said computer memory; and defining a rule, associated with said second table, which operates to associate said fourth table with all of said plurality of tasks except for said first task and to associate said fifth table with all of said plurality of tasks except for said second task.

10. A method as claimed in claim 7 additionally comprising the steps of:

constructing a fourth table for storing data which describe capabilities required of said at least one of said resources; and linking said fourth table to said third table within said computer memory.

11. An apparatus for associating information comprising:

a memory for storing a first, second, and third process table and a branch table;

said first process table storing a data element describing a first process utilized by both said first and second tasks and for storing a first out-flow pointer data element identifying said branch table, and wherein said first process table includes a data element describing a release list, said release list including a data element describing resources released at said first process;

said branch table storing first and second condition elements corresponding to second and third out flow pointers, said second out flow pointer identifying said second process table and said third out flow pointer identifying said third process table;

said second process table storing a data element describing a second process which is performed to accomplish said first task;

said third process table storing a data element describing a third process which is performed to accomplish said second task; and a computer which translates data descriptive of demand for resources into a generic form comprising said first, second, and third process tables and which further acts to control allocation of said resources in a manner determined by said first, second, and third process tables.

12. An apparatus as claimed in claim 11 wherein:
said first process table stores a pointer to a bill-of-resources memory structure;
said bill-of-resources memory structure stores a pointer to a bill-of-resources table; and
said bill-of-resources table stores a pointer to a plurality of initially consumed resources which are consumed at said first process.

13. An apparatus as claimed in claim 12 wherein said bill-of-resources memory structure includes:
a second bill-of-resources table; and
a rule data element, coupled to said first process table, said bill-of-resources table, and to said second bill-of-resources table, for associating said bill-of-resources table with said first task and said second bill-of-resources table with said second task.

14. An apparatus as claimed in claim 12 wherein:
said bill-of-resources table includes an attribute pointer data element; and
said apparatus additionally comprises an attribute table configured to be identified by said attribute pointer data element, said attribute table including a data element describing resource attribute capabilities required of said initially consumed resources by at least one of said first and second tasks.

15. An apparatus as claimed in claim 14 wherein said bill-of-resources table includes a second attribute pointer data element, and said apparatus additionally comprises:
a second attribute table stores a pointer to said second attribute pointer data element, said second attribute table including a data element describing alternate resource attribute capabilities required of said initially consumed resources by said at least one of said first and second tasks; and
a rule data element, coupled to said bill-of-resources table, said attribute table, and said second attribute table, for associating said attribute table with said first task and said second attribute table with said second task.

16. An apparatus as claimed in claim 11 wherein each of said first, second, and third process tables and said branch table is associated with a job table, said job table including a data element describing a job collectively performed by said first, second, and third processes.

17. An apparatus as claimed in claim 11 wherein:
each of said first, second, and third process tables and said branch table are associated with an operation table, said operation table storing a data element describing an operation collectively performed by said first, second, and third processes;
said operation table stores a pointer to a set of additional process tables; and
said operation table and said additional process tables stores a pointer to a job table, said job table including a data element describing a job collectively performed by said operation table and said additional processes.

* * * * *

UNITED STATES PATENT AND TRADEMARK OFFICE
CERTIFICATE OF CORRECTION

PATENT NO. : 5,321,605
DATED : June 14, 1994
INVENTOR(S) : William Chapman et al.

It is certified that error appears in the above-indentified patent and that said Letters Patent is hereby corrected as shown below:

In column 21, line 61, claim 6, delete "11" and insert therefor --1--.

In column 22, line 42, claim 9, delete "al" and insert therefor --all--.

Signed and Sealed this

Thirty-first Day of October 1995

Attest:

BRUCE LEHMAN

*Attesting Officer*          *Commissioner of Patents and Trademarks*